(12) United States Patent
Ciuffo

(10) Patent No.: US 6,922,938 B1
(45) Date of Patent: Aug. 2, 2005

(54) FISHING LURE

(76) Inventor: Arthur G. Ciuffo, 12545 Jacksonhill Dr., El Cajon, CA (US) 92021

( * ) Notice: Subject to any disclaimer, the term of this patent is extended or adjusted under 35 U.S.C. 154(b) by 0 days.

(21) Appl. No.: 10/620,035

(22) Filed: Jul. 15, 2003

Related U.S. Application Data

(60) Provisional application No. 60/396,030, filed on Jul. 16, 2002.

(51) Int. Cl.$^7$ .............................................. A01K 85/00
(52) U.S. Cl. .................................... 43/42.15; 43/42.28
(58) Field of Search ........................... 43/42.11–42.16, 43/42.28, 42.29

(56) References Cited

U.S. PATENT DOCUMENTS

| | | | | |
|---|---|---|---|---|
| 3,971,152 A | * | 7/1976 | Husson, Jr. ................. | 43/42.06 |
| 5,094,026 A | * | 3/1992 | Correll et al. ............. | 43/42.28 |
| 5,113,607 A | * | 5/1992 | Pate ........................... | 43/42.28 |
| 5,207,016 A | * | 5/1993 | Pate ........................... | 43/42.28 |
| 5,950,347 A | * | 9/1999 | McQueeny .................. | 43/42.04 |
| 6,182,390 B1 | * | 2/2001 | Watkins ....................... | 43/42.31 |

* cited by examiner

*Primary Examiner*—Teri Pham Luu
*Assistant Examiner*—Kimberly S. Smith
(74) *Attorney, Agent, or Firm*—Charles C. Logan, II

(57) ABSTRACT

A fishing lure configured to simulate a squid. It has an elongated body member that tapers at its front end and has a front ring for attachment to a fishing line. An elongated head member is connected to the front end of the body member by structure that allows the head member to freely wobble upwardly, downwardly, to the left and to the right at acute angles to the longitudinal axis of the body member. The connecting structure also includes structure that allows the head member to freely rotate approximately 180 degrees about the longitudinal axis of the head member. A plurality of flexible tentacles extend from an annular skirt that is secured to the rear end of the head member. The tentacles hide a hook that is attached to structure extending from the head member.

7 Claims, 2 Drawing Sheets

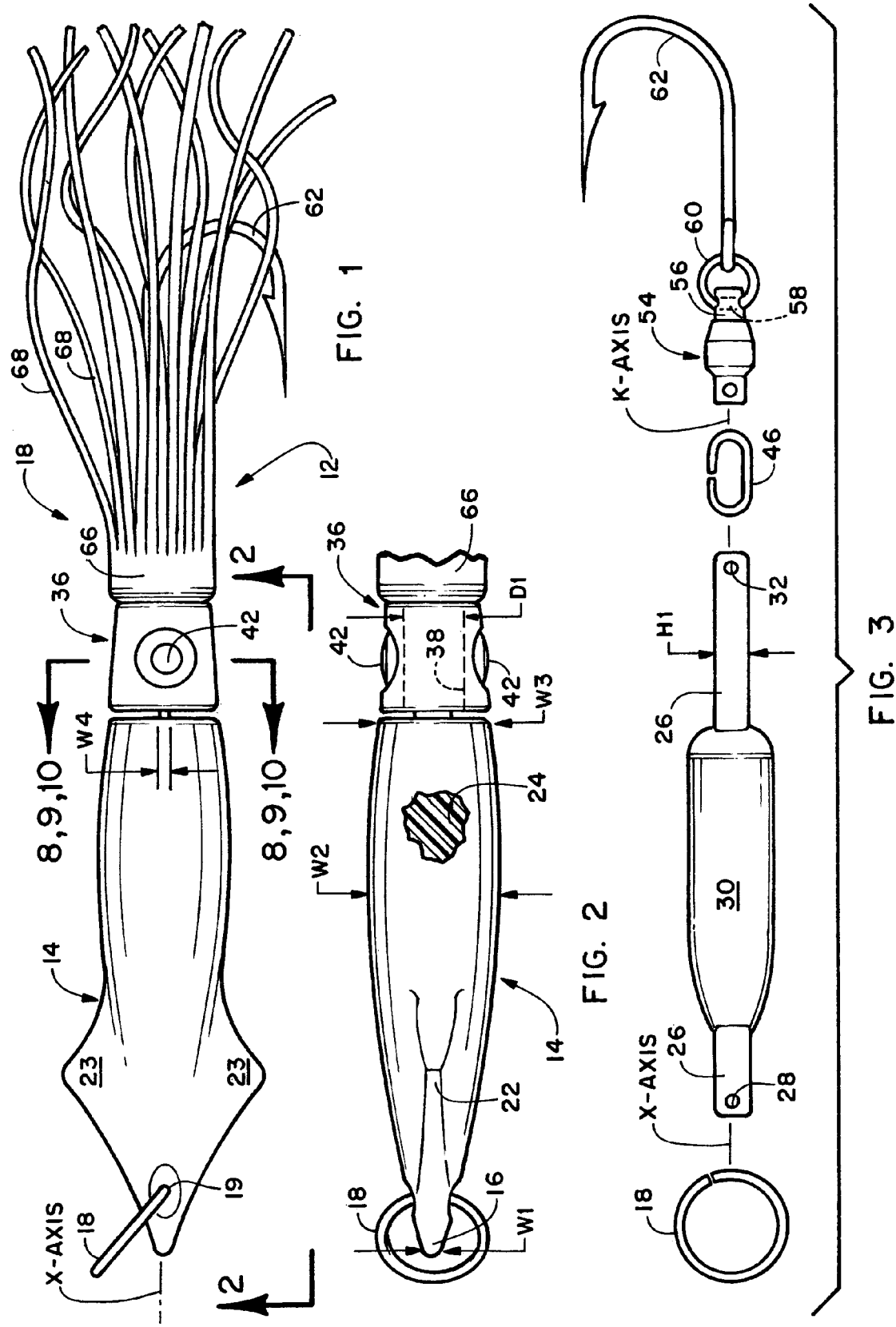

FISHING LURE

The application claims priority of provisional patent application Ser. No. 60/396,030 filed Jul. 16, 2002.

BACKGROUND OF THE INVENTION

The invention relates to fishing and more specifically to a fishing lure.

Fishing lures are used to simulate natural species that game fish instinctively feed upon. The fisherman attaches the lure directly to a fishing line. In one method of use, the lure is dropped vertically in the water to any depth the angler desires. An up and down jigging motion or technique called yo-yoing is employed that raises and lowers the lure to attract game fish into striking the lure. The distance the lure travels up and down and the speed of the retrieve are both controlled by the angler.

Another popular method of using the lure is the cast and retrieve. The angler deploys or casts the lure into the water some distance away, then lets the lure sink to a determined depth and simply retrieves the lure back to the point of origin while controlling the retrieve speed. Often a retrieve, stop and jerky motion is used to further enhance the lure performance.

It is an object of the invention to provide a novel fishing lure that has a wobble motion and a rotational motion.

It is another object of the invention to provide a novel fishing lure that simulates the appearance of a squid.

It is also an object of the invention to provide a novel fishing lure that has a pair of side fins that allows the lure to randomly plane through the water simulating the flight of a live pursued squid.

It is an additional object of the invention to provide a novel lure that is economical to manufacture and market.

SUMMARY OF THE INVENTION

The main components of the novel fishing lure are the body member and the head member. The body member has an internal connector member extending substantially its length with a portion extending outwardly from its rear end. A lead sinker weight is attached to the flat bar connector member. Different sized lead sinker weights can be used to vary the performance of the fishing lure. The body member is preferably made of a plastic material that is molded around the flat bar connector member and the lead sinker weight. The body member may also be made of phosphorescent material so that it glows. A front ring is attached to the nose portion of the body member for attachment to a fishing line. The body member has a longitudinally extending X-axis.

The head member is an elongated member having an axially extending bore hole and an H-axis. The head member has a primary portion having recesses formed in its opposing left and right sides for receiving eye members. Aligned apertures extend transversely through the primary portion and a pin passes through these apertures and also passes through a middle ring that is connected to both the rear end of the flat bar connector member and the front end of a 360 degree swivel assembly. The head member also has a neck portion with an annular flange adjacent its rear end. A skirt having a plurality of tentacles extending from its rear end is secured to the neck portion and the tentacles surround a fish hook connected to a 360 degree swivel assembly. The front end of the swivel assembly is also captured in the interior of the bore hole of the head member.

The fishing lure's weight forward design and side projecting fins cause the lure to randomly plane through the water simulating the flight of a live pursued quid. In addition to the lure's erratic movements, the design also incorporates a unique rotating head section where life like oversized prismatic eyes couple with long tantalizing tentacles that further complete the illusion of the lure being the real thing. The head assembly being hollow through its center acts as a small sound chamber emitting clicking sounds when the lure is in motion.

One manner in which the fisherman uses the lure is to drop it vertically into the water to the depth the angler desires. An up and down jigging motion or technique called yo-yoing is employed that raises and lowers the lure to attract game fish into striking it. The distance the lure travels up and down and the speed of the retrieve are both controlled by the angler.

Another popular method used is the cast and retrieve. The angler deploys or casts the lure into the water some distance away, then lets the lure sink to the desired depth and simply retrieves the lure back to the point of origin while controlling the retrieve speed. Often a retrieve, stop and jerking motion is used to further enhance lure performance.

The fisherman controls both the deployment and movement of the lure and can modify the presentation of the lure at will. Although the yo-yo technique and the simple cast and retrieve method is most often used with this lure, there are limitless variations to the action this lure produces. The angler is only restricted by his own imagination. The unique versatility of the squid lure clearly makes it a valuable addition to the salt water anglers arsenal.

DESCRIPTION OF THE DRAWINGS

FIG. 1 is a top plan view of the novel fishing lure with the head member rotated clockwise to the extreme position;

FIG. 2 is a partial side elevation view of FIG. 1 with portions broken away;

FIG. 3 is an exploded side elevation view of the basic interior components of the fishing lure;

DESCRIPTION OF THE PREFERRED EMBODIMENT

Figure 4:
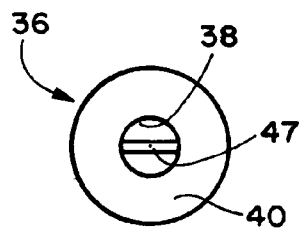
FIG. 4 is a front end elevation view of the head member.
Figure 5:
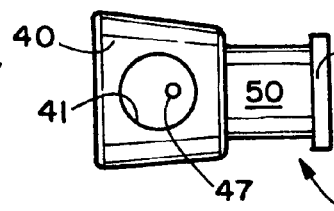
FIG. 5 is a side elevation view of the head member.
Figure 6:
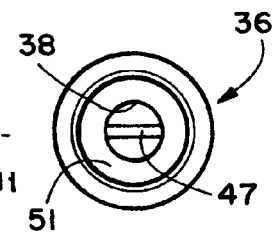
FIG. 6 is a rear elevation view of the head member.
Figure 7:
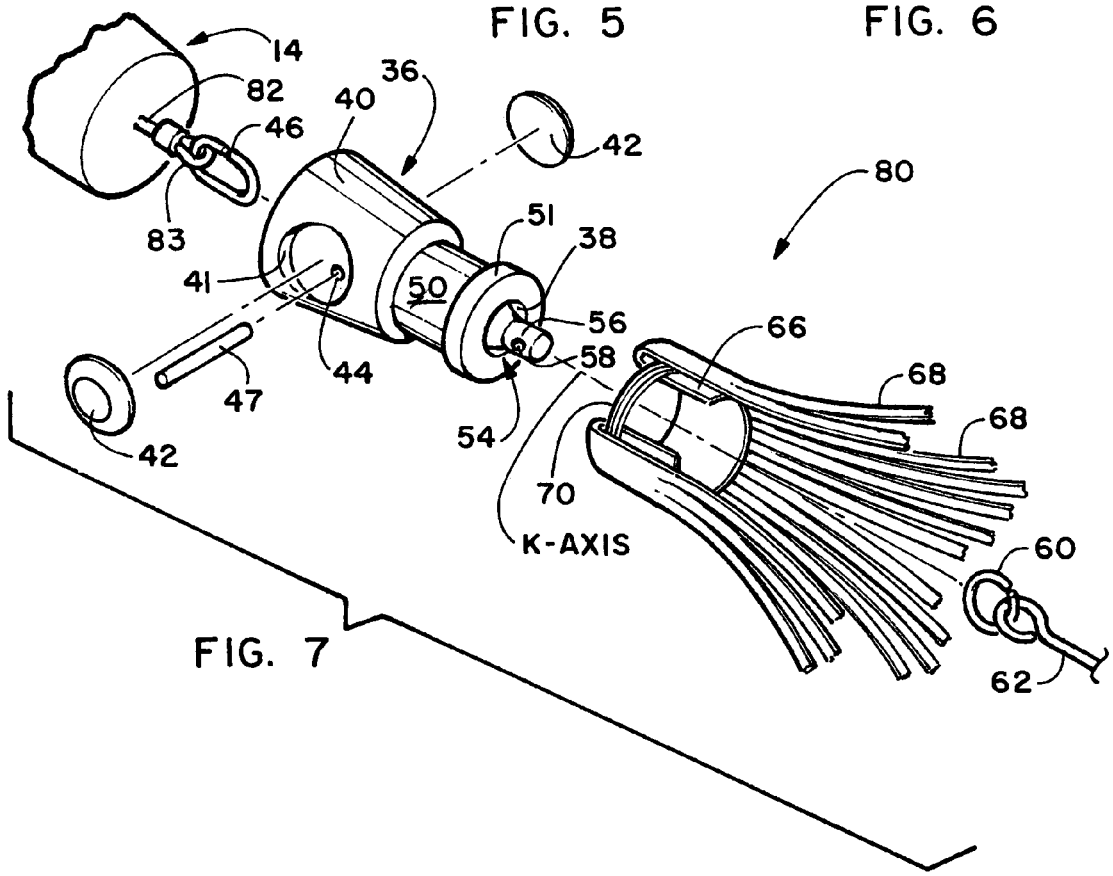
FIG. 7 is a partial exploded perspective view of a first alternative embodiment of the fishing lure.

The fishing lure will now be described by referring to FIGS. 1–10 of the drawings. The fishing lure is generally designated numeral 12 and FIGS. 1, 2 and 7 illustrate its external configuration.

Fishing lure 12 has a body member 14 having a nose portion 16 formed at its front end. A front ring 18 passes through a bore hole 19 extending through body member 14. A fishing line would be attached to front ring 18. A pair of fins 22 and 23 extend laterally from body member 14. Nose portion 16 has a width W1, the widest portion of the central section of body member 14 has a width W2 and the rear end has a width W3.

The interior 24 of body member 14 has an elongated flat bar connector member 26 having a longitudinally extending X-axis. It has an aperture 28 adjacent its front end through which front ring 18 passes. A lead sinker weight 30 is connected to the intermediate portion of flat bar connector member 26. Flat bar connector member 26 has a height H1 and a width W4. It also has an aperture 32 adjacent its rear end. The interior 24 of body member 14 and its outer surface is preferably formed of a plastic material.

Fishing lure 12 has a head member 36 that is illustrated in FIGS. 1–2 and 4–10. It has a longitudinally extending H-axis and a bore hole 38 that extends from its front end to its rear end. The diameter D1 of the bore hole 38 is much larger than the diameter W4 of flat bar connector member 26 and also greater than the height H1 of flat bar connector member 26. This allows the head member to wobble freely both upwardly, downwardly and to the left and right with the longitudinal H-axis making various acute angles with the X-axis of body member 14.

Head member 36 has a primary portion 40 having a pair of recesses 41 formed in its left and right sides respectively for receiving an eye member 42. A bore hole 44 passes transversely through to the opposite sides of primary portion 40. A middle ring 46 is looped through aperture 32 and aperture 48 and is positioned within the bore hole 38. When pin 47 is inserted entirely through apertures 44 and the interior of the bore hole 38, it also passes through middle ring 46. Head member 36 also has a neck portion 50 having an annular flange 51 adjacent its rear end. A 360 degree swivel assembly 54 is loosely contained in bore hole 38 and it has a front end whose aperture 48 that receives middle ring 46. The rear end of swivel pin 56 is captured in swivel assembly 54 and it is free to rotate 360 degrees around its K-axis. Swivel pin 56 has a bore hole 58 passing transversely therethrough which receives a rear ring 60. A fish hook 62 is captured on rear ring 60. The width of swivel assembly 54 is small enough that it is free to wobble upwardly and downwardly about its attachment point to middle ring 46. Also the swivel pin 56 is free to rotate 360 degree which gives added motion to the fish hook 62.

A plastic skirt 66 has a plurality of flexible tentacles 68 formed on its rear end. Skirt 60 is stretched over neck portion 50 and secured thereto by a band 70.

Figure 8:
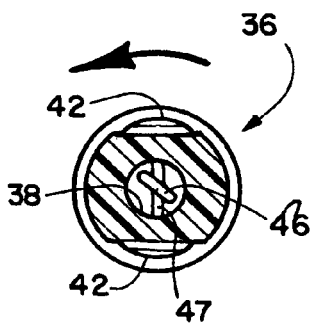
FIG. 8 is a cross sectional view taken along lines 8—8 of FIG. 1 showing the head member rotated counterclockwise to its extreme left position.
Figure 9:
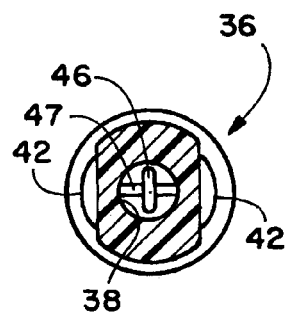
FIG. 9 is a cross sectional view taken along lines 9—9 of FIG. 1 showing the head member in its central position.
Figure 10:
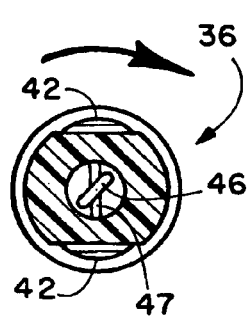
FIG. 10 is a cross sectional view taken along lines 10—10 showing the head member rotated clockwise to its extreme right position.

FIGS. 8–10 are cross sectional views through head member 36. FIG. 8 shows head member 36 rotated counterclockwise to the limit of its travel as pin 47 engages middle ring 46. FIG. 9 shows the head member at its central position and FIG. 10 shows head member 36 rotated clockwise to its termination position. This provides additional wobble motion to the head member as it is pulled through the water.

FIG. 7 is an exploded rear perspective view of an alternative embodiment fishing lure 80. It uses an elongated wire rod 82 having wire loops 83 formed in both its front and rear ends. The remaining structure of fishing lure 80 is the same as that illustrated and discussed previously and it has similar numbers.

What is claimed:

1. A squid jig lure comprising:
   an elongated body member having a front end, a middle portion, a rear end, a longitudinally extending X-axis, an interior and an outer surface; said body member having a top surface, a bottom surface, a left side surface and a right side surface; said front end having a predetermined width W1; said middle portion at its widest dimension having a predetermined width W2; said rear end having a predetermined width W3; W2 is greater than W1 to form a nose portion at said front end; a vertically oriented front bore hole extends downwardly through said nose portion from said top surface to said bottom surface; a vertically oriented front ring passes through said front bore hole; said front ring is pivotable laterally to the left and the right to give said squid jig lure a lateral waggle to the left and the right; said front ring provides a structure for attaching a fishing line thereto;
   a rigid fin extends radially outward from said right side surface of said body member and a rigid fin extends radially outward from said left side surface of said body member;
   an elongated head member having a front end, a rear end, a longitudinally extending H-axis, an outer surface, a top side, a bottom side, a left side and a right side; a longitudinal bore hole passes through said head member from said front end to said rear end and has a diameter D1; said head member having a primary portion adjacent said front end and a neck portion adjacent said rear end; a pair of diametrically opposed recesses in said outer surface of said primary portions; aligned radial bore holes in said recesses communicate with said longitudinal bore hole;
   an elongated connecting member having a front end, an intermediate portion, a rear end, a height H1, a width W4 and an X-axis; a front aperture is formed in said front end for receiving said front ring; a rear aperture is formed in said rear end and said rear end extends into said longitudinal bore hole of said head member; a middle ring passes through said rear aperture and said middle ring receives a pin inserted transversely through said radial bore holes in said primary portion of said head member to connect said body member and said head member together; said rear end of said body member and said front end of said head member being longitudinally spaced from each other so that their respective X-axis and H-axis can pivot at acute angles to each other; said height H1 and width W4 being smaller than D1 so that said head member can reciprocally rotate transversely to said body member a predetermined number of degrees about said H-axis;
   an eye member inserted into each of said respective recesses in said head member;
   a plurality of flexible tentacles secured to said rear end of said head member; and
   a 360 degree swivel assembly having a longitudinally extending K-axis that is secured to said middle ring to allow a fishing hook connected thereto to freely rotate 360 degrees about said K-axis.

2. A squid jig lure as recited in claim 1 wherein said body member is made of plastic material.

3. A squid jig lure as recited in claim 1 wherein said predetermined number of degrees is approximately 180 degrees.

4. A squid jig lure as recited in claim 1 further comprising a fishing hook connected to said 360 degree swivel assembly.

5. A squid jig lure as recited in claim 1 further comprising a lead sinker weight located in said interior of said body member.

6. A squid jig lure as recited in claim 1 wherein said connecting member is a flat bar.

7. A squid jig lure as recited in claim 1 wherein said connecting member is a wire rod.

* * * * *